April 16, 1968

A. J. M. BRETTE 3,377,858

LIQUID VOLUMETRIC METER

Filed Oct. 22, 1964

United States Patent Office 3,377,858
Patented Apr. 16, 1968

3,377,858
LIQUID VOLUMETRIC METER
Alfred Jacques Marius Brette, Montrouge, France, assignor to Compagnie des Compteurs, Paris, France, a company of France
Filed Oct. 22, 1964, Ser. No. 405,748
Claims priority, application France, Nov. 26, 1963, 954,979, Patent 1,384,743
4 Claims. (Cl. 73—258)

ABSTRACT OF THE DISCLOSURE

A liquid meter comprising two shells of hemispherical shape joined along a diametral plane in angularly adjustable fluid tight relation, one shell including a tubular inlet for a liquid extending at an angle of 45° with respect to said diametral plane, the other shell including a tubular outlet for a liquid extending at an angle of 45° with respect to said diametral plane, means within said shells for sensing the quantity of liquid passing through said shells, indicator means coupled to the sensing means for furnishing visible measure of the quantity of liquid passing from said inlet to the outlet.

---

The present invention is directed to a liquid volumetric meter.

The meter according to this invention is characterized, on the one hand, in that the housing thereof is constituted by two hemispherical shells each having a piping nipple the axes of which have a 45° angle relationship with the junction plane of said shells and, on the other hand, in that the totalizator of said meter, which is housed within the cavity of one of said shells, can be orientated by rotating the same about the axis of its driving device, said axis being preferably at right angles with the junction plane of the shells.

Owing to these features, it is possible either to mount the meter according to the present invention on a piping of which the upstream and downstream branches have their axes disposed in a perpendicular relationship one with the other, as well as on a straight piping, or to mount the meter in a piping located at a very short distance from a wall, thus avoiding the use of bends which are otherwise necessary in such cases with the conventional fluid meters, whatever their type (speedometers, volumetric or annular piston meters) and whatever the use thereof (hot water meters, for example).

It is also possible to direct the totalizator digit drums so that the latter are always in a horizontal plane and in the reading direction in front of the user or observer.

The meter according to this invention can be mounted, for example, under a sink, at the upper part of a wall-cupboard, as well as on any piping disposed at a short distance from a wall.

There exist meters of which the housing is constituted by two shells each having a piping the axis of which makes a 45° angle with the junction plane of said shells but, since in these meters the totalizator cannot be orientated, the above-mentioned branching advantages cannot be obtained.

The present description will be now described in an illustrative manner with particular reference to an oscillating disc type meter, as disclosed in my co-pending patent application Ser. No. 352,897, now U.S. Patent No. 3,289,476, although it is applicable to any other type of meter.

Figure 5:
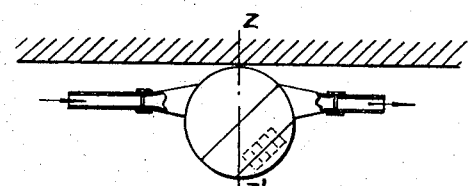
Figure 6:
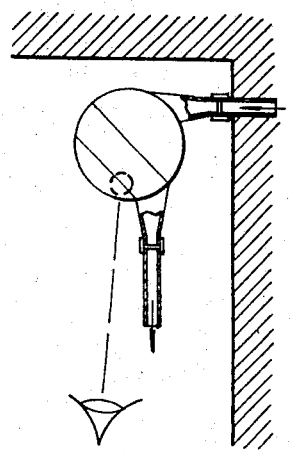
Figure 7:
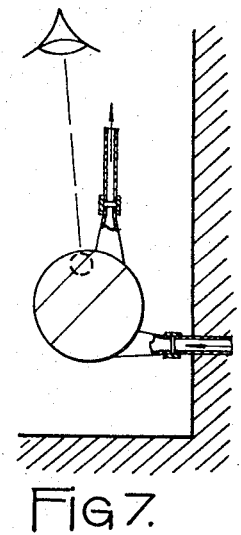

FIGURES 5, 6 and 7 schematically represent the meter according to this invention, as adapted to three particular conditions such as above-mentioned.

Figure 1:
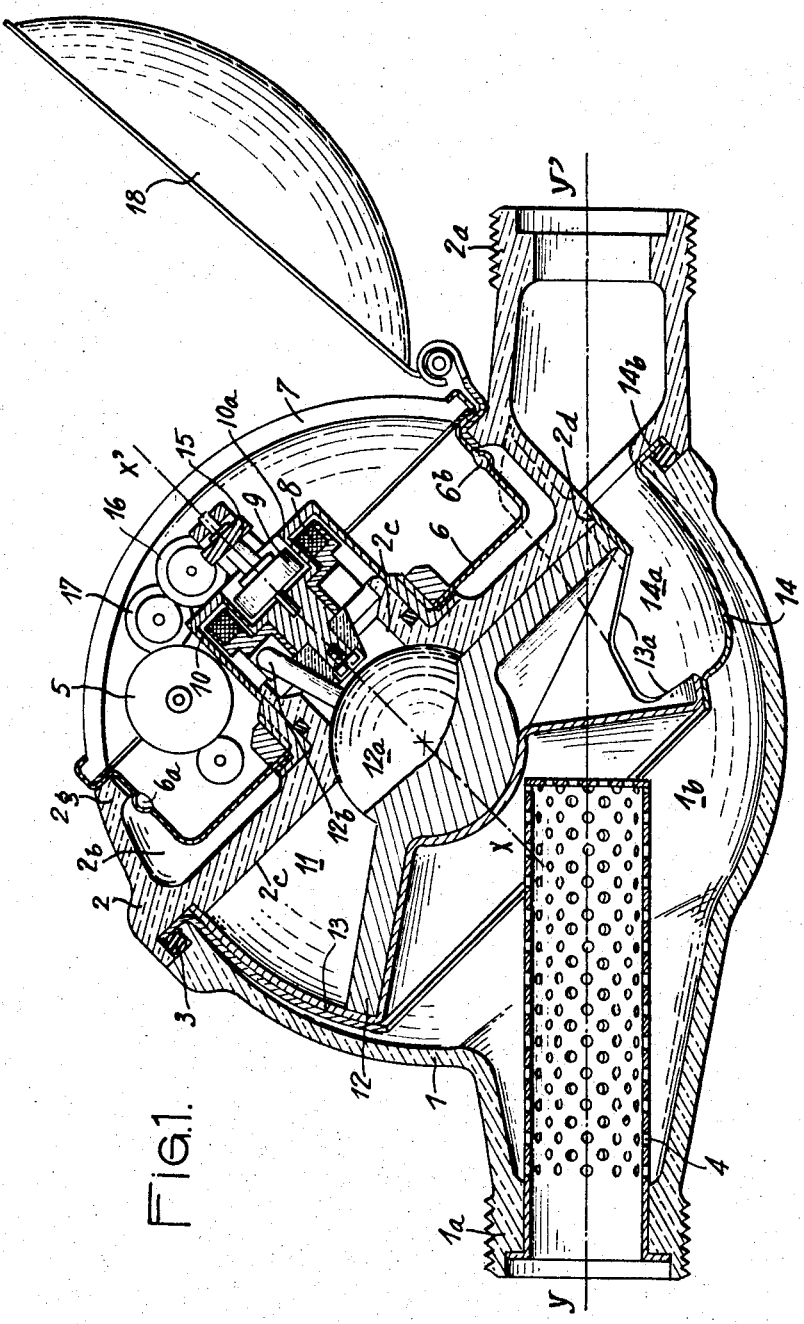
FIGURE 1 is a sectional view of an oscillating disc type fluid meter, with both pipings having a coaxial relationship.

In the embodiment of the invention as shown in FIG. 1, the references 1 and 2 indicate two hemispherical shells constituting the housing of the meter. Each of said shells includes a piping or tubular extension 1a and 2a, both disposed along the same axis Y–Y'. The oscillation axis X–X' has a 45° angle relationship with the piping axis Y–Y'.

Both shells 1 and 2 are assembled by any known means (not shown) the fluid tightness between the shells being insured by a seal 3. The piping 1a communicates with the cavity 1b in shell 1 through a strainer or filter 4.

Reference 11 denotes a metering chamber within which oscillates a conical disc 12, said metering chamber being defined, on the one hand, by a bowl 13 the internal surface of which has a shape corresponding to the external part of the volume produced by the disc 12 during its oscillation and, on the other hand, by the flat wall 2c of shell or cover 2. Bowl 13 is centered by a shoulder 2d in wall 2c.

Figure 4:
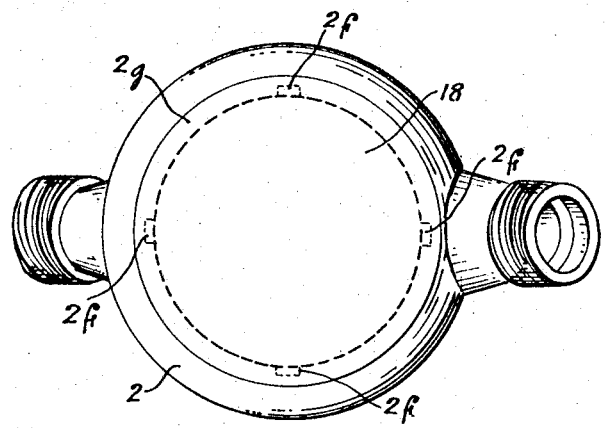
FIGURE 4 is a perspective top view of the meter, with the lid thereof closed, and in which are shown the four slots or notches by means of which the totalizator can be set in the preferential positions according to FIG. 3.

A totalizing mechanism 5 is disposed within a fluid-tight enclosure in the cavity 2b defined inside shell 2. Said enclosure comprises a casing 6, a central cup 10 and a hemispherical shaped bowl glass 7. Said enclosure is fixed by means of four slots or notches 2f in the upper edge 2g of shell or cover 2 (see FIG. 4), which are adapted to allow the passage of the casing 6 of which four projections, disposed at right angles one with another, are guided by and in notches 2f. Two of said projections, bearing the references 6a and 6b, are shown in FIG. 1. The positioning of said enclosure, after introducing the latter in the cavity, is obtained by slightly rotating the enclosure so that the four above-mentioned projections of casing 6 are set off in relation to the notches or slots 2f. Clamping of the enclosure is then effected by any known means which forms no part of this invention.

The wall 2c of shell 2 has in its central part a concavity guidingly accommodating the spherical hub 12a of the disc 12. This concavity has a central opening 2e of cylindrical shape allowing the passage of a catch-pin 12b on disc 12. During its nutation movement around the oscillation axis X–X' of the disc, catch-pin 12b causes the totalizator 5 to be rotated through toothed wheels 15, 16 and 17 extending through the wall 10a of the housing 10 by means of a known magnetic driving device which is outside the scope of this invention.

This device is schematically shown in FIG. 1 by a radially magnetized ring 8, driven by said catch-pin 12b and by a disc 9, also radially magnetized, which drives the toothed wheels 15, 16, 17 and totalizator 5.

Bowl 13, preferably made from stainless steel sheet and obtained by a stamping process, has in a fashion known per se an inlet openig (not shown) and a outlet opeing 13a at either side of a diaphragm (also not shown) having for its function to separate the inlet and outlet chambers of the liquid to be metered, according to an arrangement commonly used in the liquid oscillating disc type meters.

In the example shown, bowl 13 is surrounded by the casing 14 which can be obtained by a stamping process. Said casing 14 has a recess 14a facing the outlet opening of said bowl. As shown in FIG. 1, said recess 14a communicates with the outlet piping 2a of the meter housing through a radial edge 14b forming a separating partition between the upstream and downstream parts of the meter.

Figure 2:
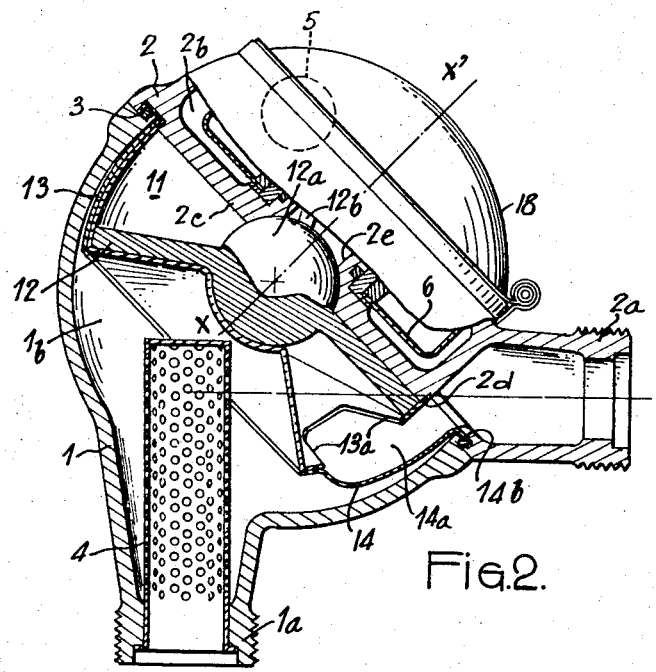
FIGURE 2 is a partly sectional view showing the same meter, with both pipings disposed at right angles one with the other.

FIGURE 2 shows the above-described meter of this invention, wherein the hemispherical shell 1 has rotated through 180° around the axis X—X, so that the pipings 1a and 2a are then disposed at right angles one with the other, with the inlet piping being vertical while the outlet piping is horizontal.

Figure 3:
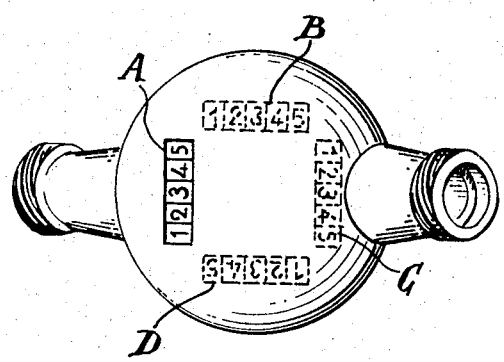
FIGURE 3 is a perspective view schematically representing the four preferential positions that the digit drums of the totalizator may be caused to assume.

FIGURE 3 represents the four preferential positions A, B, C and D of the totalizator, which have a right angle relationship one with another when one rotates the enclosure of said totalizator. In FIG. 1, the totalizator is in the position A.

FIG. 5 shows schematically how a meter according to this invention is mounted on a straight piping at a very short distance from a vertical wall. In such a case, the totalizator is in the position B. Should the fluid circulate in a reverse direction of that shown in FIG. 5, the meter would occupy a position symmetrical with that shown in said FIGURE around the axis Z–Z', and the totalizator would be rotated to the position D.

FIG. 6 shows also schematically how such a meter is mounted on a piping of which the upstream and downstream branches have a right angle relationship one with the other; such arrangment corresponds, for example, to the mounting of a meter at the upper part of a wall-cupboard. In such a case, the totalizator is in the position C.

FIG. 7 shows an arrangement which is in its general principle similar to that of FIG. 6 and corresponds, for example, to a positioning of a meter according to this invention under a sink.

I claim:

1. A liquid meter comprising two shells of hemispherical shape joined along a diametral plane in angularly adjustable fluid tight relation, one shell including a tubular inlet for a liquid extending at an angle of 45° with respect to said diametral plane, the other shell including a tubular outlet for a liquid extending at an angle of 45° with respect to said diametral plane, means within said shells for sensing the quantity of liquid passing through said shells from said inlet to the outlet, indicator means coupled to the sensing means for furnishing visible measure of the quantity of liquid passing from said inlet to the outlet, said indicator means being supported coaxially within said other shell for relative rotation therewith in a plane parallel to the plane of angular adjustment between said shells, said indicator means being visible within said other shell, and means between said indicator means and said other shell enabling securing of the indicator means in one of a umber of different angular positions relative to said other shell whereby the angular relation between the indicator means and the said other shell can be varied independently of the angular relation between said inlet and outlet so that the indicator means can be made visible for all positions of installation of the shells.

2. A meter as claimed in claim 1 wherein said indicator means comprises a casing defining a sealed enclosure and a totalizer means in said enclosure, said means for securing the indicator means to said other shell comprising at least one projection on the casing, said other shell having a notch for each projection arranged around the shell such that each projection can be inserted into a notch for various angular positions of the casing relative to said other shell.

3. A meter as claimed in claim 2 wherein said casing is provided with four projections at 90° spacing.

4. A meter as claimed in claim 3 wherein said other shell has four notches at 90° spacing enabling the casing to occupy four angular positions relative to said other shell spaced at 90° from one another.

References Cited

UNITED STATES PATENTS

| | | | |
|---|---|---|---|
| 714,823 | 12/1902 | Samian | 235—94 X |
| 2,041,762 | 5/1936 | Hazard et al. | 235—94 X |
| 2,213,799 | 9/1940 | Bassett | 235—94 X |
| 3,071,003 | 1/1963 | Brette | 73—273 |

FOREIGN PATENTS 313,575    10/1903    France.

RICHARD C. QUEISSER, *Primary Examiner.*

JAMES GILL, *Examiner.*

E. D. GILHOOLY, *Assistant Examiner.*